United States Patent
Ho et al.

(10) Patent No.: US 10,620,446 B1
(45) Date of Patent: Apr. 14, 2020

(54) ENDCAP ARRAY FOR OPTICAL FIBERS

(71) Applicants: James G. Ho, Los Angeles, CA (US); Gregory D. Goodno, Los Angeles, CA (US)

(72) Inventors: James G. Ho, Los Angeles, CA (US); Gregory D. Goodno, Los Angeles, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 331 days.

(21) Appl. No.: 15/709,123

(22) Filed: Sep. 19, 2017

(51) Int. Cl.
*G02B 27/10* (2006.01)
*G02B 5/18* (2006.01)

(52) U.S. Cl.
CPC .......... *G02B 27/1006* (2013.01); *G02B 5/18* (2013.01); *G02B 5/1814* (2013.01); *G02B 5/1861* (2013.01); *G02B 27/1073* (2013.01); *G02B 27/1086* (2013.01); *G02B 5/1823* (2013.01)

(58) Field of Classification Search
CPC .............. G02B 27/1006; G02B 6/0006; G02B 6/00045; G02B 6/005; G02B 6/0033; G02B 6/262
See application file for complete search history.

(56) References Cited

U.S. PATENT DOCUMENTS

| | | | |
|---|---|---|---|
| 5,346,583 A * | 9/1994 | Basavanhally | G02B 6/322 156/273.3 |
| 6,215,925 B1 | 4/2001 | Kaneyama | |
| 6,643,068 B2 * | 11/2003 | Mandella | G02B 21/02 359/628 |
| 7,391,561 B2 * | 6/2008 | Di Teodoro | G02B 6/02347 359/341.1 |
| 8,184,361 B2 | 5/2012 | Rothenberg et al. | |
| 8,411,712 B2 | 4/2013 | Honea et al. | |
| 8,441,718 B2 | 5/2013 | Mead | |
| 8,502,869 B1 | 8/2013 | Fuhr et al. | |
| 8,503,840 B2 * | 8/2013 | Hu | B23K 1/0008 385/33 |
| 8,873,908 B2 | 10/2014 | Hu et al. | |
| 9,689,740 B2 | 6/2017 | Klennert | |
| 2002/0131700 A1 * | 9/2002 | Nakama | G02B 6/32 385/33 |
| 2003/0142909 A1 * | 7/2003 | Suzuki | G02B 6/32 385/33 |

(Continued)

FOREIGN PATENT DOCUMENTS

WO    WO 2015/017071    2/2015

OTHER PUBLICATIONS

Redmond, et al.: "Diffractive coherent combining of a 2.5 kW fiber laser array into a 1.9 kW Gaussian beam." Optics letters 37.14 (2012): 2832-2834.

*Primary Examiner* — Eric L Bolda
(74) *Attorney, Agent, or Firm* — Tarolli, Sundheim, Covell & Tummino LLP (57) ABSTRACT

A multi-fiber endcap array can include an endcap that includes a stem surface and an exit surface, wherein the exit surface opposes the stem surface. The multi-fiber endcap array can also include a plurality of stems extending from the stem surface of the endcap and a plurality of optical fibers. Each of the plurality of optical fibers is optically coupled and mechanically coupled to a corresponding stem of the plurality of stems.

18 Claims, 10 Drawing Sheets

(56) References Cited

U.S. PATENT DOCUMENTS

| | | | |
|---|---|---|---|
| 2006/0188195 A1* | 8/2006 | Zamel | G02B 6/4296 385/33 |
| 2008/0190509 A1 | 8/2008 | Cox | |
| 2012/0045169 A1* | 2/2012 | Hu | B23K 1/0008 385/33 |
| 2012/0237745 A1* | 9/2012 | Dierkes | A61K 6/0215 428/215 |
| 2016/0170143 A1 | 6/2016 | Mizushima et al. | |
| 2017/0201059 A1 | 7/2017 | Villeneuve et al. | |

* cited by examiner

ENDCAP ARRAY FOR OPTICAL FIBERS

TECHNICAL FIELD

The present disclosure relates to an endcap array for optical fibers and methods for forming the endcap array.

BACKGROUND

For some fiber optic applications, including the areas of fiber amplifiers and lasers, optical fibers may be coupled to core-less endcaps. In some examples, these endcaps can be formed as homogeneous transparent elements with a length of a few millimeters. Since the endcaps contain no waveguide (fiber core), light propagates in these regions as beams that expand toward the ends of the endcaps.

Endcaps can be formed by attaching (e.g. fusion splicing) small pieces of homogeneous glass to the fiber ends. In some situations, such as photonic crystal fibers, it can be sufficient to heat the fiber end (e.g. with a fusion splicer) to collapse microscopic holes.

A fiber laser is a laser in which the active gain medium is an optical fiber doped with rare-earth elements such as erbium, ytterbium, neodymium, dysprosium, praseodymium, thulium or holmium. Fiber lasers are related to doped fiber amplifiers, which provide light amplification without resonant oscillation. Fiber nonlinearities, such as stimulated Raman scattering or four-wave mixing can also provide gain and thus serve as gain media for a fiber laser.

SUMMARY

One example relates to a multi-fiber endcap array. The multi-fiber endcap array can include an endcap that includes a stem surface and an exit surface, wherein the exit surface opposes the stem surface. The multi-fiber endcap array can also include a plurality of stems extending from the stem surface of the endcap and a plurality of optical fibers. Each of the plurality of optical fibers is optically coupled and mechanically coupled to a corresponding stem of the plurality of stems.

Another example relates to an apparatus that can include a plurality of multi-fiber endcap arrays, wherein each of the plurality of multi-fiber endcap arrays includes an endcap with a stem surface and an exit surface, wherein the exit surface opposes the stem surface. Each multi-fiber endcap array also includes a plurality of stems extending from the stem surface of the endcap and a plurality of optical fibers. Each of the plurality of optical fibers is optically coupled and mechanically coupled to a corresponding stem of the plurality of stems. The apparatus also includes a base underlying the plurality of multi-fiber endcap arrays. The plurality of multi-fiber endcap arrays are adhered together.

Yet another example relates to a method that includes forming a plurality of stems that are rigidly attached to a monolithic glass block. The method also includes slicing the monolithic glass block to form a plurality of stemmed endcaps and fusing a plurality of optical fibers to a set of stems on a given endcap of the plurality of stemmed endcaps.

DETAILED DESCRIPTION

This disclosure relates to the fabrication and assembly of a multi-fiber endcap array. The multi-fiber endcap array can be a high power, high precision fiber-to-free space fiber endcap. Multiple stems are attached to the endcap. Moreover, multiple optical fibers are attached to the stems to form the multi-fiber endcap array. The endcap and the stems can be formed from a subtractive manufacturing process that eliminates an interface (discontinuity) between the stems and the endcap.

Light beams propagate through each of the plurality of optical fibers and upon reaching a stem, the light begins to diffract. The diffraction of light continues as the light traverses the endcap to an exit surface that faces free-space. As explained herein, the multi-fiber endcap array can be fabricated with relatively inexpensive and simple techniques. The light beams propagating through free space can be combined by a beam combiner in a weapon system or a communication system.

Multi-fiber arrays are employed in many optical coupling applications, for example optical couplers for communications, or arrayed fiber emitter sources for laser beam combining. In some examples, parameters for such multi-fiber arrays include fiber cores that are co-aligned to within tolerances that comprise a small fraction of their natural diffraction-limited output. This tolerance can be difficult to achieve for high power sources owing to power handling limitations of the materials (optical damage or absorption), or due to thermal deformation of the structures when used at high power. However, through employment of the multi-fiber endcap array described herein, these tolerances can be achieved with relatively inexpensive processes.

Figure 1:
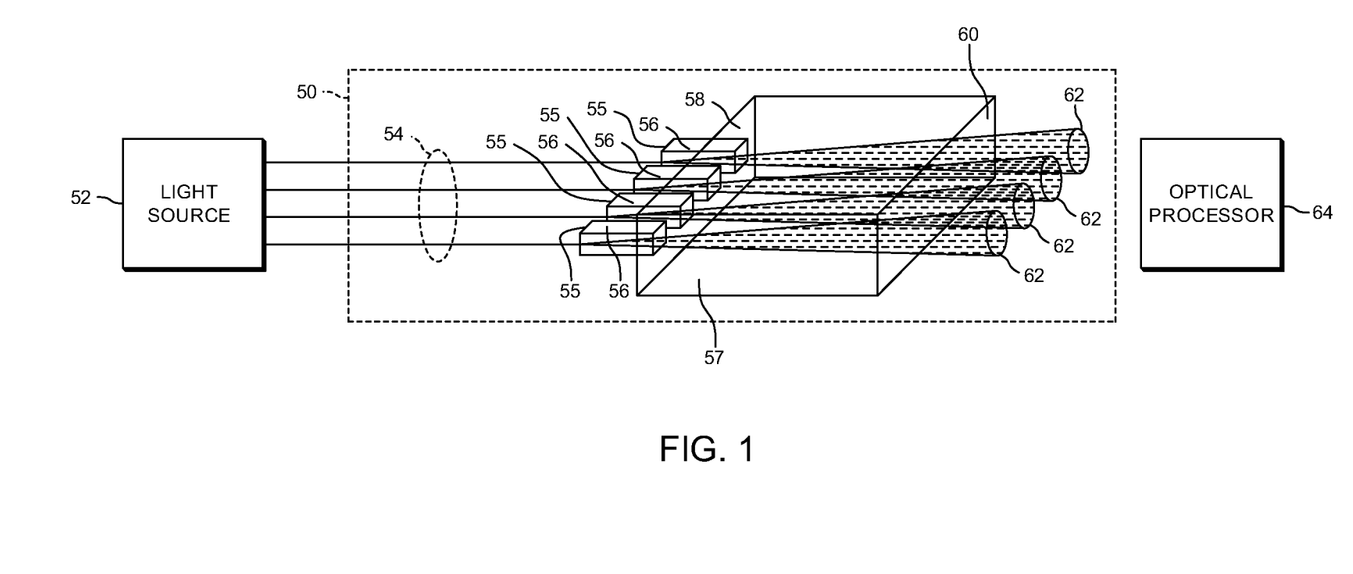
FIG. 1 illustrates an example of a multi-fiber endcap array for laser combining.

FIG. 1 illustrates an example of a multi-fiber endcap array 50 for laser combining. The multi-fiber endcap array 50 can be coupled to a light source 52 that can provide J number of optical signals to a corresponding J number of optical fibers 54 of the multi-fiber endcap array 50, where J is an integer greater than or equal to two (2). In some examples, the J number of optical fibers 54 can be pigtails that are coupled (via splicing) to other optical fibers that are coupled to the light source 52. Alternatively, the J number of optical fibers can be coupled directly to the light source 52. The light source 52 can provide high-power laser beams (e.g., 1 kilowatt (kW) or more) or low-power laser beams (e.g., less than 1 kW) on each of the J number of optical fibers 54.

Moreover, it is understood that the light source 52 may be representative of multiple optical sources.

The multi-fiber endcap array 50 includes J number of stems 56 that are rigidly attached to a stem surface 57 of an endcap 58 to form the multi-fiber endcap array 50. That is, a portion of the optical fibers 54, the stems 56 and the endcap 58 are constituent components of the multi-fiber endcap array 50. Each stem 56 can be formed from the same material as the endcap 58. In fact, in some examples, as explained herein, the J number of stems 56 can be formed from a subtractive manufacturing process to avoid an interface between the J number of stems 56 and the endcap 58. Alternatively, in some examples, the stems 56 can be adhered to the endcap 58 with an optical contacting, an adhesive free bonding process or similar process. Each of the J number of stems 56 and the endcap 58 are coreless (no waveguide). Accordingly, light beams entering the J number of stems and the endcap 58 diffracts (spreads) as each light beam propagates from a stem entrance surface 55 to the exit surface 60.

In the example illustrated in FIG. 1, a single endcap 58 is illustrated, but in other examples, multiple endcaps 58 can be adhered together. In such a situation, the endcaps 58 can be coupled along an edge (a narrow surface) or a face (a wider surface) to form a one dimensional (1D) or two-dimensional (2D) array of stems 56. The endcap 58 can include an exit surface 60 that allows light to exit to free-space. The exit surface 60 opposes the stem surface 57. The exit surface 60 can have an anti-reflection coating to minimize reflection of light at the exit surface 60. The multi-fiber endcap array 50 allows light to pass from the light source 52, through the J number of optical fibers 54, to the J number of stems 56, through the endcap 58 to the exit surface 60 into free space. J number of light beams 62 are represented as cones that depict diffraction from the stem entrance surface 55 (an interface) between the optical fibers 54 into the (coreless) stems 56 and continues through a length of the endcap 58.

In some examples, the J number of light beams 62 can be directed toward an optical processor 64. The optical processor 64 can be, for example, a beam combiner, such as a spectral beam combiner (SBC) that can adjust a trajectory of light in one dimension. Alternatively, the optical processor can be a coherent beam combiner (CBC). In other examples, the optical processor 64 can be a communication device, such as a beam combiner for a multiplexer.

The multi-fiber endcap array 50 provides a homogenous glass volume for high power laser beams exiting cores of the J number of optical fibers 54 until the laser beams reach a safe intensity, such as an intensity below a damage threshold of the antireflection coating of the exit surface 60. Moreover, the J number of stems 56 and the endcap 58 hold the optical fibers 54 together to preserve the relative positions and angles of each of the J number of optical fibers 54. The J number of stems 56 and the endcap 58 reduce effects from temperature changes and/or mechanical vibrations. Furthermore, as discussed herein, the multi-fiber endcap array 50 can be fabricated with relatively simple, inexpensive processes.

FIGS. 2-6 illustrate an example fabrication process for forming a multi-fiber endcap array, such as the multi-fiber endcap array 50 of FIG. 1. For purposes of simplification of explanation, FIGS. 2-6 employ the same reference numbers to denote the same structure.

Figure 2:
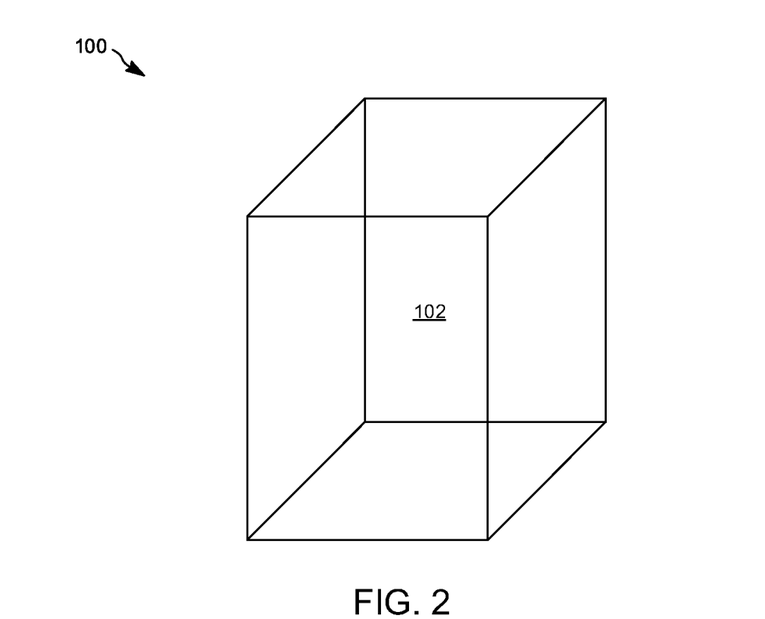
FIGS. 2, 3, 4, 5 and 6 illustrate stages of an example process of fabricating a multi-fiber endcap array.

In FIG. 2, a diagram 100 illustrates a monolithic glass block 102 that can be formed by an additive or subtractive process. The monolithic glass block 102 can be a rectilinear polyhedron three-dimensional (3D) block. In the example illustrated, the monolithic glass block 102 is a cube, but in other examples, the monolithic glass block 102 can be a rectangular prism with surfaces of different sizes or have curved surfaces. The monolithic glass block 102 can be formed of fused silica ($SiO_2$) or other substantially transparent material.

Figure 3:
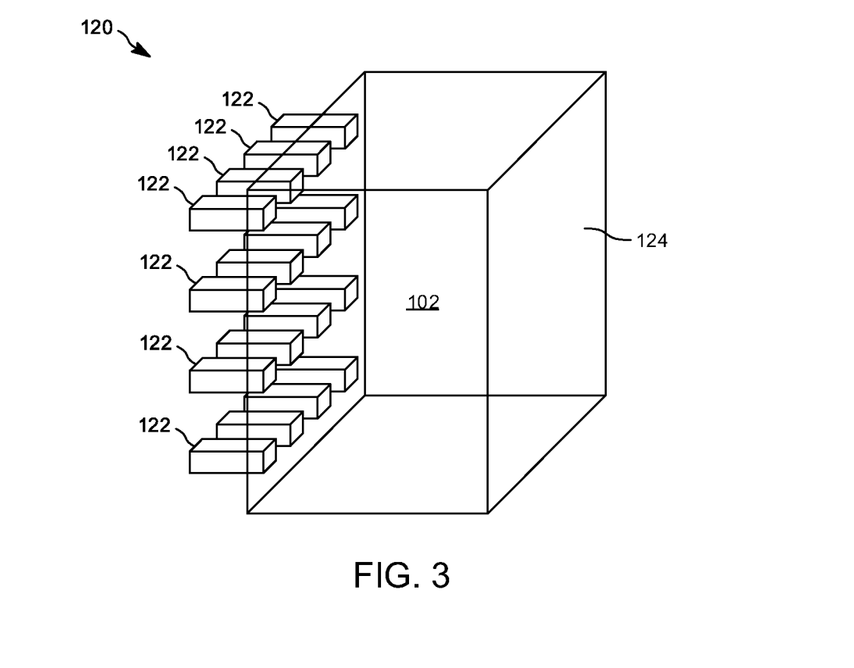

FIG. 3 illustrates a diagram 120 that includes the monolithic glass block 102 with J×K number of stems 122 rigidly connected to the monolithic glass block 102, where J and K are each integers greater than or equal to two (2). That is, the diagram 100 depicts J number of columns of stems 122 and K number of rows of stems 122. For purposes of simplification, not all of the J×K stems 122 are labeled.

In some examples, the J×K number of stems 122 can be formed with a subtractive manufacturing process, such as computer numeric control (CNC) machining. In particular, the monolithic glass block 102 of the diagram 100 can be machined to remove portions of glass to form the J×K number of stems 122 illustrated in the diagram 120. In this manner, there is no interface (discontinuity) between an end of each stem 122 and the monolithic glass block 102. As an alternative, the J×K number of stems 122 can be adhered to the monolithic glass block 102 with an additive manufacturing process, such as an optical contacting or adhesive free bonding technique. The dimensions of the stems 122 can be based on a cross-sectional size of optical fibers (not shown in the diagram 120) that are adhered to each of the stems 122. After forming the J×K number of stems 122, an exit surface 124 of the monolithic glass block 102 may be anti-reflection coated.

Figure 4:
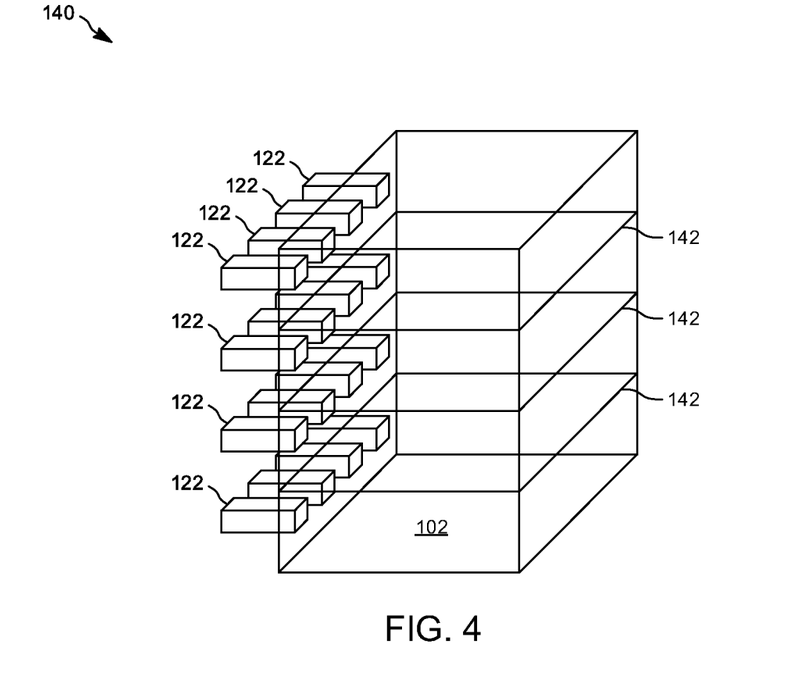

FIG. 4 illustrates a diagram 140 that includes K−1 number of lines 142 depicting cutting points for slicing the monolithic glass block 102. That is, the monolithic glass block 102 can be cut with a laser cutting or micro-sawing technique to form K number of stemmed endcaps that each have J number of stems 122.

Figure 5:
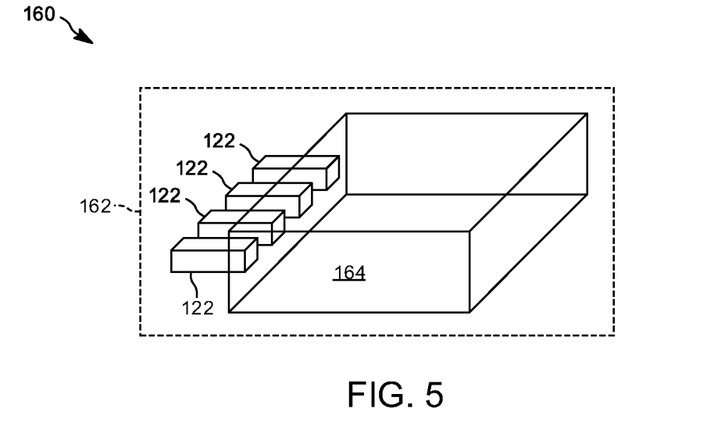

FIG. 5 illustrates a diagram 160 that illustrates a stemmed endcap 162 formed by the slicing depicted in diagram 140. The stemmed endcap 162 includes an endcap 164 and K number of stems 122. The stemmed endcap 162 is formed from the monolithic glass block 102 of FIGS. 2-4.

Figure 6:
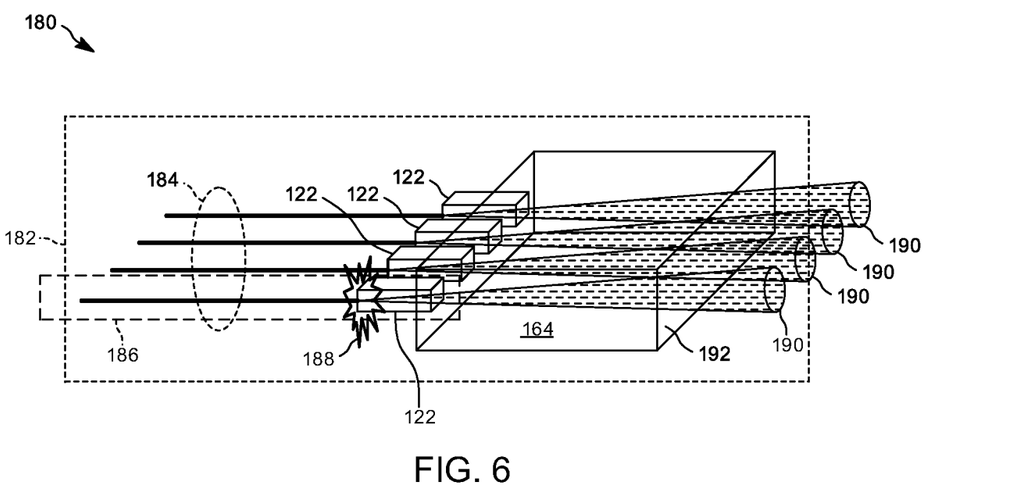

FIG. 6 illustrates a diagram 180 that illustrates a (1D) monolithic endcap array 182. The monolithic endcap array 182 can be formed by coupling J number of optical fibers 184 to corresponding J number of stems 122. The diagram 180 includes a sub-diagram 186 depicting a process for coupling a given optical fiber 184 to a given stem 122. To couple the given stem 122 to the given optical fiber 184, a core of the given optical fiber 184 can be aligned in an abutting position with the given stem 122 and the given stem 122 can be heated as indicated by the symbol 188.

Each of the J number of stems 122 can be a rectangular prism. Moreover, a length and face size of each stem 122 can be based on a cross-section size of the optical fibers 184. In particular, each stem 122 can have a cross-sectional area (where "cross-section" refers to the dimensions transverse to the direction of light propagation) with an area that is at least as large as the cross-sectional size of the optical fibers 184 and up to about five (5) times larger than the cross-sectional size of the optical fibers 184. In addition, the length (along the direction of light propagation) of each stem 122 is selected to be at least as long as the cross-sectional size of the optical fibers 184. These stem dimensional constraints are driven by the range over which it is possible to uniformly co-heat the optical fibers 184 and the stems 122 so that optical fibers 184 and the stems 122 can be coupled together as indicted by symbol 188. In addition, as illustrated in the diagram 180 by cones representing light beams 190, the dimensions of the stems 122 and the endcap 164 are selected to avoid clipping the light beams 190. Additionally, if an anti-reflection coating was not already applied before slicing (e.g., in diagram 120) then one can be applied to an exit face 192 of the endcap 164 to prevent reflection of the light beams 190 back into the endcap 164.

Thus, by applying the process indicated by the diagrams in FIGS. 2-6, the endcap array 182 can be formed. The monolithic endcap array 182 can align J number of optical fibers 184. In some examples, each of the J number of optical fibers 184 can be implemented as pigtails that are coupled (via splicing) to a longer optical fiber that is coupled to a light source (e.g., the light source 52 of FIG. 1). In other examples, each of the J number of optical fibers 184 can be coupled directly to the light source.

It is noted that the general shape features in the monolithic multi-fiber endcap array 182 is not meant to be limiting. For instance, in some other examples, stems with an octagonal cross section can be employed. Such octagonally shaped stems can be formed by sawing off corners of rectilinear stems (e.g., corners of the stems 122). These octogonally shaped stems are a closer match to the round cross-section of the optical fibers 184, which may improve the quality of fiber splicing process (indicated by the symbol 188).

Figure 7A:
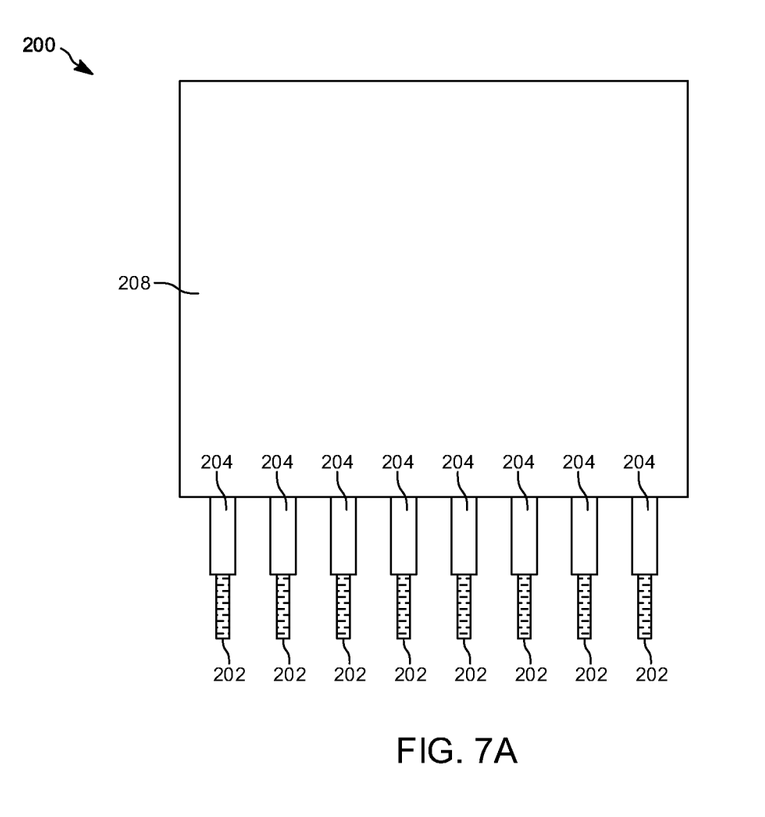
FIG. 7A illustrates a top view of a multi-fiber endcap array.
Figure 7B:
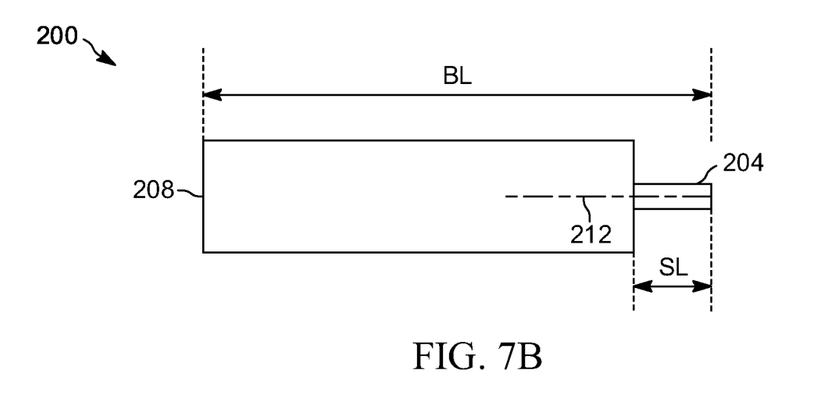
FIG. 7B illustrates a side view of the multi-fiber endcap array.
Figure 7C:
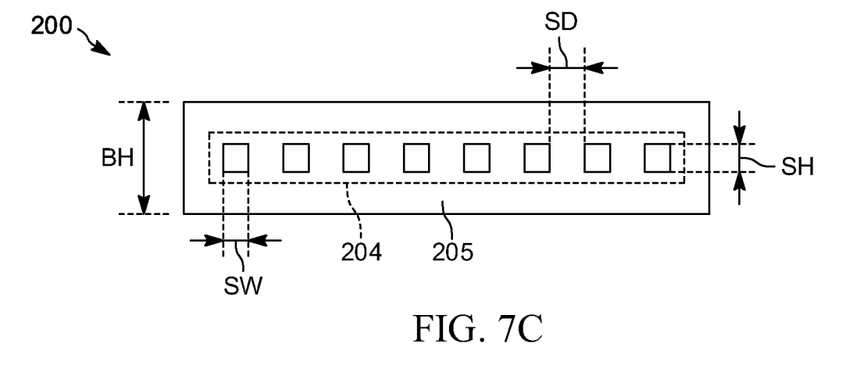
FIG. 7C illustrates a back view of the multi-fiber endcap array.
Figure 7D:
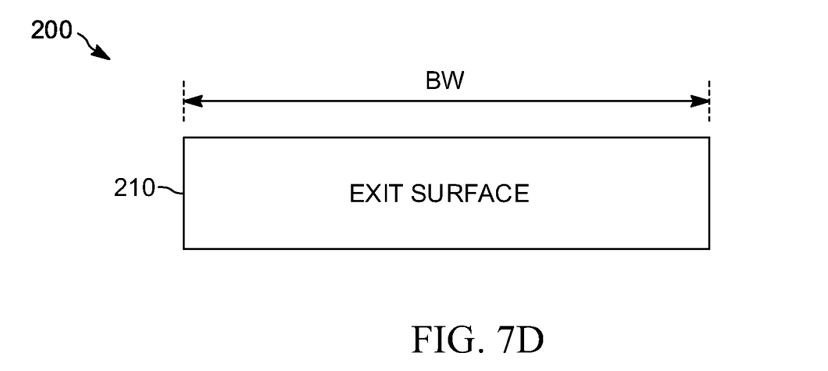
FIG. 7D illustrates a front view of the multi-fiber endcap array.

FIGS. 7A-7D illustrate multiple views of a 1D multi-fiber endcap array 200. Thus, FIGS. 7A-7D employ the same reference numbers to denote the same structure. FIG. 7A depicts a top view of the 1D multi-fiber endcap array 200. FIG. 7B illustrates a side view of the 1D multi-fiber endcap array 200. FIG. 7C illustrates a back view of the 1D multi-fiber endcap array 200. FIG. 7D illustrates a front view of the 1D multi-fiber endcap array 200. The 1D multi-fiber endcap array can be formed, for example, with the process depicted in FIGS. 2-6. It is understood that the terms "top, bottom, front, side and back" are employed as only one example orientation from a given vantage point. Furthermore, for purposes of simplification of explanation, throughout the description of FIGS. 7A-7D, the terms "length, width and height" are employed to denote different dimensions of the 1D multi-fiber endcap array 200 in one possible orientation. It is understood that the orientation of the 1D multi-fiber endcap array 200 varies based on the environment of application.

The 1D multi-fiber endcap array 200 includes J number of optical fibers 202 coupled to J number of stems 204 that extend from a stem surface 205 of the endcap 208. Moreover, the J number of stems 204 are coupled to the endcap 208. The 1D multi-fiber endcap array 200 is designed such that light beams propagate through the optical fibers 202 to the stems 204, where each light beam begins to diffract, and the diffraction continues through the endcap 208 out an exit surface 210 into free-space. The exit surface 210 can be coated with an anti-reflection coating to reduce reflection of light beams back into to the endcap 208.

Each stem 204 has a stem length (labeled in FIG. 7B as "SL"), a stem height (labeled in FIG. 7C as "SH") and a stem width (labeled in FIG. 7C as "SW") that can vary based on the dimensions and optical properties (e.g., cross-sectional diameter, core diameter, diffraction angle, etc.) of the optical fibers 202 and/or the properties of the light beam (e.g., intensity) that traverses the optical fibers 202. Similarly, the endcap 208 has a block length (labeled in FIG. 7B "BL") and a block height (labeled in FIG. 7C as "BH") that also vary based on optical properties of the optical fibers 202 and the properties of the light. In particular, the dimensions of the endcap 208 and the stems 204 are selected to avoid clipping of light beams that traverse the stems 204 and the endcap 208. Further, a block width (labeled in FIG. 7D as "BW") varies based on the number of optical fibers 202 employed.

For example, if the cross-sections of the optical fibers 202 are about 0.3 mm diameter, the face of the each stem 122 can have a stem height, SH and stem width, SW of at least 0.3 mm (the diameter of the cross section of the optical fiber 202). Additionally, the stem height, SH and the stem width, SW can each be up to about 1.5 mm. For instance, in some examples, the stem height, SH and the stem width, SW of each stem 204 can form a 1×1 mm square with a tolerance of about 0.025 mm. Moreover, the stem length, SL of each stem 204 can be about 3 mm or more. In this manner, each stem 204 is sufficiently long to minimize heat conduction into the endcap 208 while fusing each stem 204 to each optical fiber 202 via heating.

Each of the stems 204 can be separated by a stem distance (labeled "SD" in FIG. 7C) of about 1 mm (or more) with a tolerance of about 0.025 mm. Further, each stem 204 can be centered about a centerline 212 of the endcap 208. In one example, the endcap 208 has a block height, BH of 3.2 mm with a tolerance of about 0.05 mm. In this example, each stem 204 can be positioned at about 1.6 mm from a top or bottom surface of the endcap 208 with a tolerance of about 0.05 mm. Additionally, the block length, BL can be about 17 mm in an example where there are eight (8) optical fibers 202.

It is understood that the sizes provided are not meant to be limiting. In other examples, different optical properties of the optical fibers 202 and/or the light beams that are propagated through the optical fibers 202 may be weighted in a manner that other dimensions are selected. Moreover, the general shape features in the 1D multi-fiber endcap array 200 is not meant to be limiting. For instance, as noted, in some other examples, stems with an octagonal cross section can be employed. Alternatively, if the method of manufacturing the stems includes adhering the stems to the endcap 208, the stems could have a round cross-section.

The core of each optical fiber 202 is coupled at or near a center of each stem 204 at a specific position and angle relative to the other fibers in the array. The accuracy of the position and angle of each of the J number of optical fibers 202 depends on the technique employed to fuse the optical fiber 202 to the stem 204. It is presumed for a given example that there are eight (8) optical fibers 202 and stems 204 employed.

Figure 8:
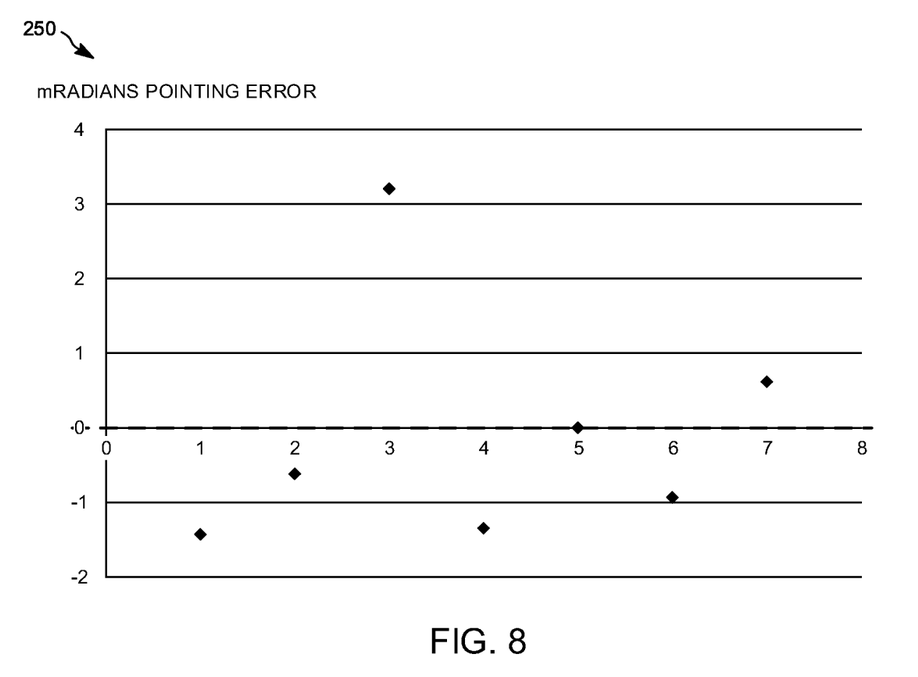
FIG. 8 illustrates a chart that plots a core pointing error for a plurality of optical fibers of a multi-fiber endcap array.

FIG. 8 illustrates a chart 250 that plots an example of relative pointing angle error, in milli-radians between eight (8) optical fibers 202 of the 1D multi-fiber endcap array 200 illustrated in FIGS. 7A-7D. It is understood that in the chart 250, the relative pointing error is plotted as an error between neighboring optical fibers. For example, in the chart 250, the pointing error of optical fiber '1' represents the pointing error between optical fiber '1' and optical fiber '2'.

Figure 9:
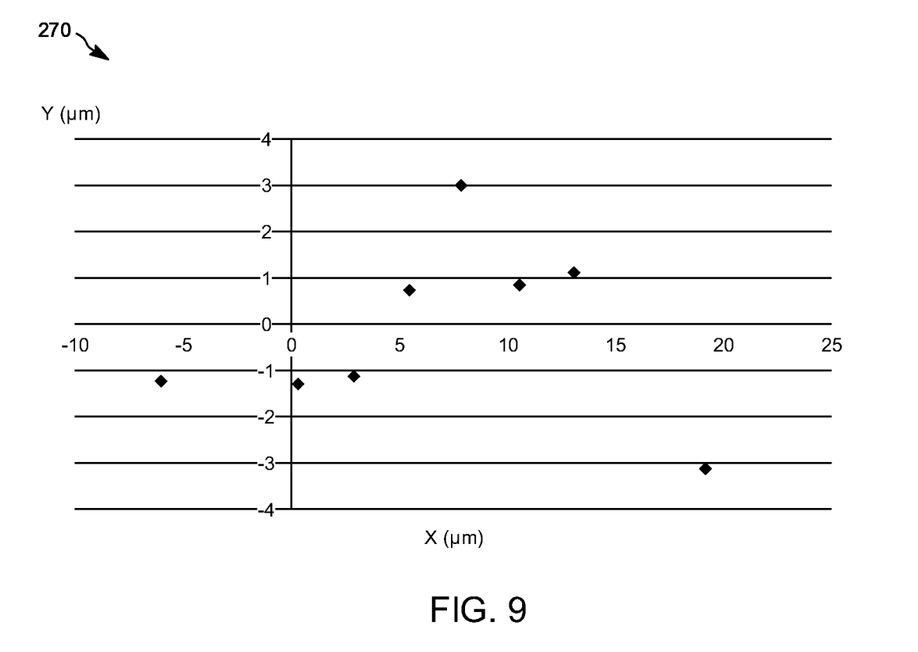
FIG. 9 illustrates a chart that plots core position error for a plurality of optical fibers of a multi-fiber endcap array.

FIG. 9 illustrates a chart 270 that plots an example of a position error in micrometers (μm) for an X-axis (e.g., a horizontal axis along the array direction BW as shown in FIG. 7D) and a Y axis (e.g., a vertical axis) of each optical fiber for each of the eight (8) optical fibers 202 of the 1D multi-fiber endcap array 200 illustrated in FIGS. 7A-7D. It is understood that in the chart 270, the position error represents a deviation (delta) from an expected position.

Referring back to FIGS. 7A-7D, as explained with respect to FIG. 1, in some examples, the output of the exit surface 210 can be combined in an SBC (spectral beam combiner). In the example illustrated by the chart 270, in an SBC, error in the X-axis can be corrected by fine-tuning the individual wavelengths of the optical light source 52. Alternatively, in examples where a highly accurate process of fusing the J number of optical fibers 202 with the stems 204 was achieved, a CBC (coherent beam combiner) could alternatively be employed. As used herein, the term "highly accurate" indicates that the position errors are a small fraction (e.g., 30% or less) of the diameter of a core of the optical fibers 202.

Figure 10:
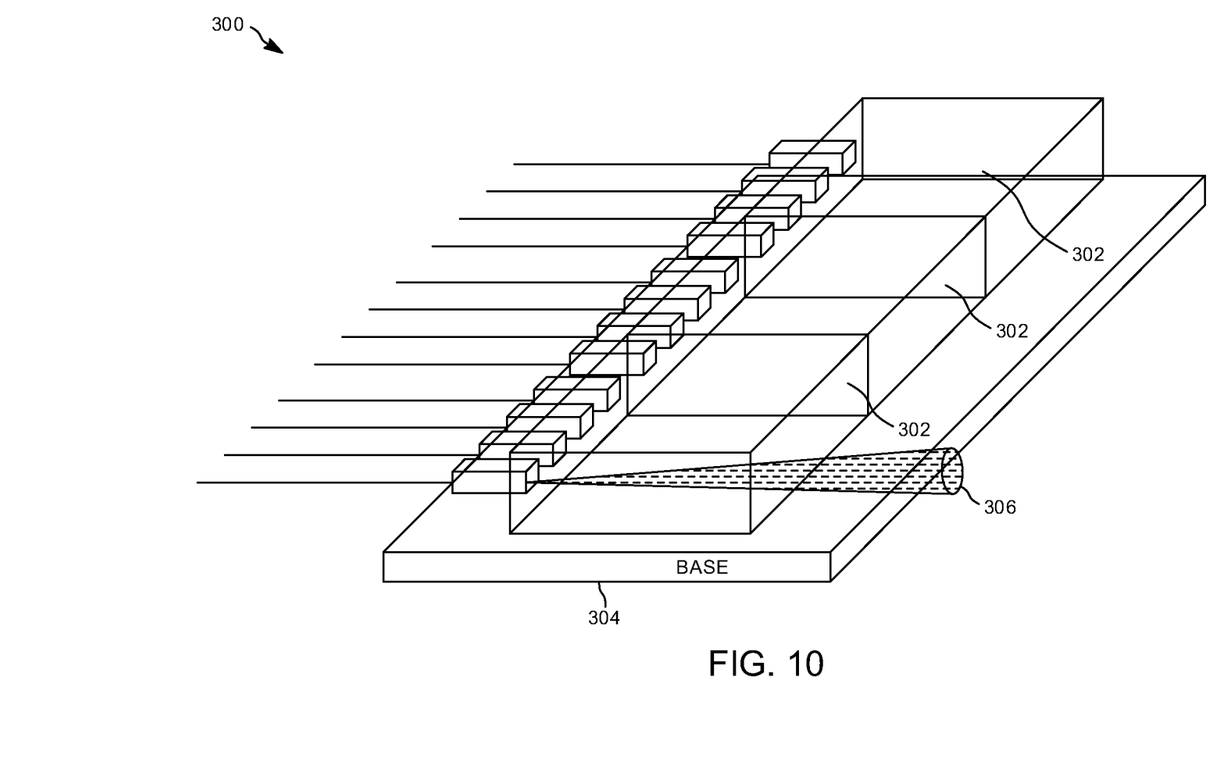
FIG. 10 illustrates an example of an extended one-dimensional multi-fiber endcap array.
Figure 11:
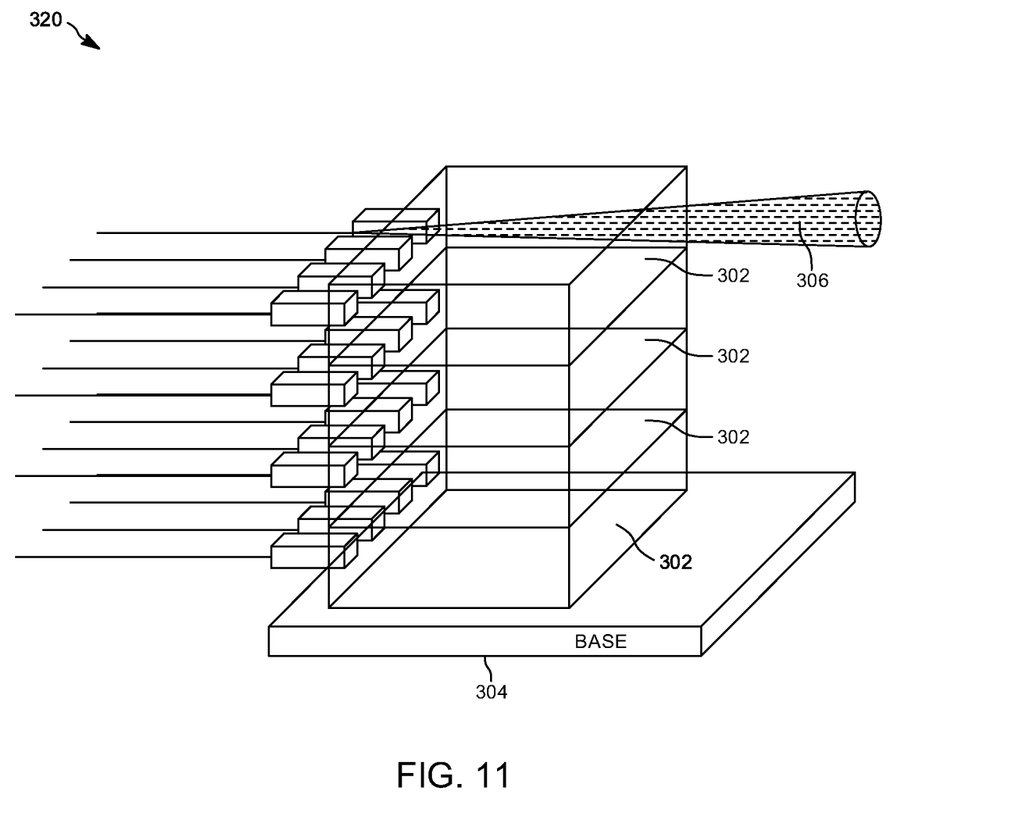
FIG. 11 illustrates an example of a two-dimensional multi-fiber endcap array.
Figure 12:
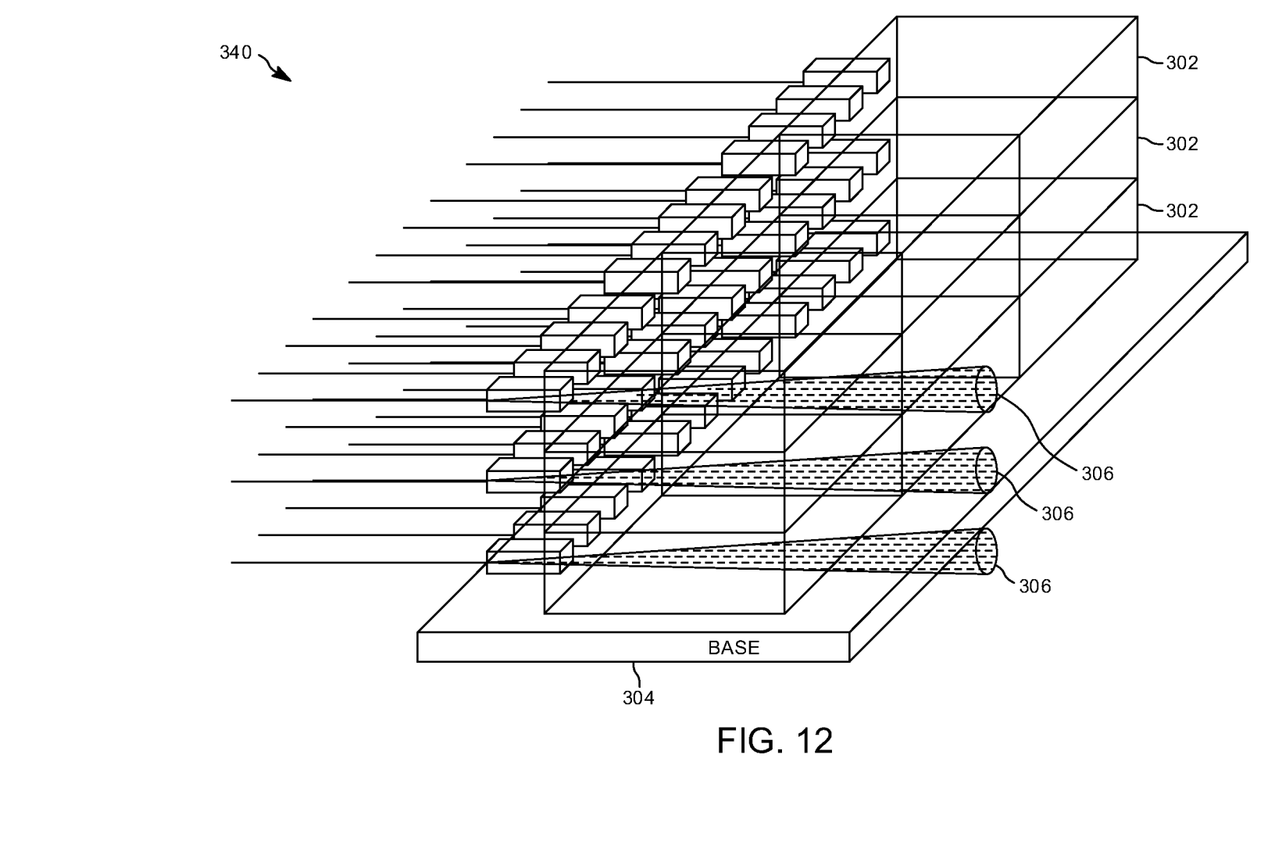
FIG. 12 illustrates another example of a two-dimensional multi-fiber endcap array.

FIGS. 10-12 depict possible arrangements of multiple instances of a multi-fiber endcap arrays. For purposes of simplification of explanation, the same reference numbers are employed in FIGS. 10-12 to denote the same structure.

FIG. 10 illustrates an example of an extended 1D multi-fiber endcap array 300. The extended 1D multi-fiber endcap array 300 includes P number of multi-fiber endcap arrays 302, where P is an integer greater than or equal to two (2) and three (3) are illustrated in FIG. 10. Each multi-fiber endcap array 302 can be implemented as an instance of the multi-fiber endcap array 50 of FIG. 1 and/or the 1D multi-fiber endcap array 200 of FIGS. 7A-7D. Accordingly, each multi-fiber endcap array 302 can have J number of optical fibers coupled to J number of stems. Thus, the extended 1D multi-fiber endcap array 300 has P×J number of optical fibers and P×J number of stems.

The P number of multi-fiber endcap arrays 302 can be adhered at edges (narrow surfaces) with an optical contacting process, heat joints, spot welding, adhesive free bonding, clamping, etc. Each multi-fiber endcap array 302 can overlay a base 304 (e.g., a substrate). The base 304 can be formed of a material with a low coefficient of thermal expansion, such as fused silica, Invar, steel, etc.

In FIG. 10, a light beam 306 is included to show a possible trajectory of light beams through the P number of multi-fiber endcap arrays 302. Each of the P×J number of optical fibers can propagate a light beam that diffracts in a manner similar to the light beam 306.

FIG. 11 illustrates a 2D multi-fiber endcap array 320. The 2D multi-fiber endcap array 320 includes R number of multi-fiber endcap arrays 302 and four (4) are illustrated in FIG. 11 and R is an integer greater than or equal to two (2). Each the multi-fiber endcap arrays 302 are stacked along a face (wide surface) in a vertical manner and overlay a base 304 and each multi-fiber endcap array 302 has J number of optical fibers and stems. Accordingly, the 2D multi-fiber endcap array 320 has R×J number of optical fibers and stems and sixteen (16) are illustrated in FIG. 11. Another example of a light beam 306 is illustrated to demonstrate a possible trajectory of light for one of the R×J number of optical fibers and stems.

FIG. 12 illustrates another example of a 2D multi-fiber endcap array 340. The 2D multi-fiber endcap array 340 includes R×P number of multi-fiber endcap arrays 302 and nine (9) are illustrated in FIG. 12, but only some of which are labeled. The multi-fiber endcap arrays 302 are stacked in a matrix-like array and overlay a base 304. Each multi-fiber endcap array 302 has J number of optical fibers and stems. Accordingly, the 2D multi-fiber endcap array 320 has R×P×J number of optical fibers and stems and thirty-six (36) are illustrated in FIG. 12. Three (3) examples of a light beam 306 are illustrated to each demonstrate a possible trajectory of light for one of the R×P×J number of optical fibers and stems.

The example arrangements of the multi-fiber endcap arrays 302 illustrated in FIGS. 10-12 are not meant to be exhaustive. It is understood that other arrangements are possible. In spite of the multiple possibilities of arrangements, in each case, the multi-fiber endcap arrays 302 can be fabricated by employing the relatively simple, inexpensive process illustrated in FIGS. 2-6.

Figure 13:
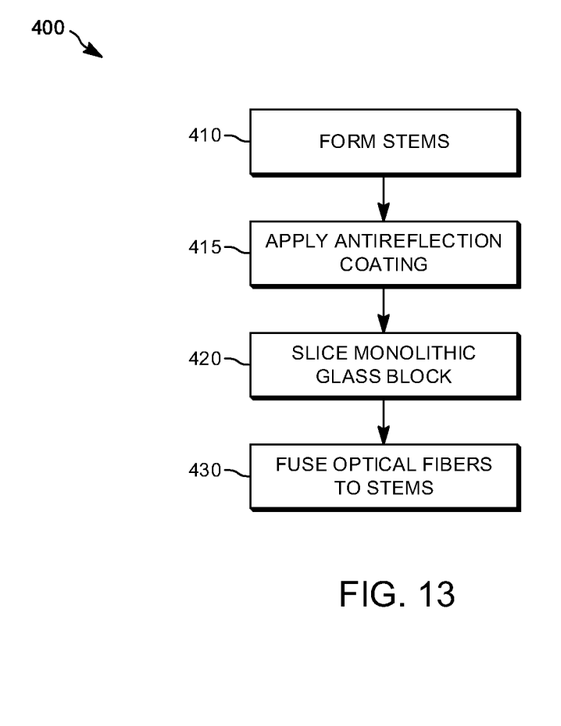
FIG. 13 illustrates a flowchart of an example method for fabricating a multi-fiber endcap array.

In view of the foregoing structural and functional features described above, example methods will be better appreciated with reference to FIG. 13. While, for purposes of simplicity of explanation, the example method of FIG. 13 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 13 illustrates a flowchart of an example method 400 for fabricating a multi-fiber endcap array, such as the multi-fiber endcap array 50 of FIG. 1 and/or the 1D multi-fiber endcap array 200 of FIGS. 2A-2D. At 410, stems (e.g., the stems 122 of FIG. 2) attached to a monolithic glass block (e.g., the monolithic glass block 102 of FIG. 2) can be formed. In some examples, the monolithic glass block can be machined to form the stems. In other examples, the stems can be adhered to the monolithic glass block. In some examples, there can be K number of rows and J number of columns of stems.

At 415, an antireflection coating can be applied to an exit face of monolithic glass block. At 420, the monolithic glass block can be sliced (e.g., with a laser cutter or other process) to form K number of stemmed endcaps (e.g., the stemmed endcap 162) that each have J number of stems. At 430, optical fibers (e.g., the optical fibers 184 of FIG. 6) can be fused to the stems 430 to form the multi-fiber endcap array.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A multi-fiber endcap array comprising:
    an endcap comprising a stem surface and an exit surface, wherein the exit surface opposes the stem surface;
    a plurality of stems extending from the stem surface of the endcap; and
    a plurality of optical fibers, wherein each of the plurality of optical fibers is optically coupled and mechanically coupled to a corresponding stem of the plurality of stems, wherein each stem is coupled to the corresponding optical fiber at a given surface and the given surface of the stem has an area greater than an area of a cross section of the corresponding optical fiber.

2. The multi-fiber endcap array of claim 1, wherein the endcap is a rectilinear polyhedron.

3. The multi-fiber endcap array of claim 1, wherein the exit surface has an antireflective coating.

4. The multi-fiber endcap array of claim 1, wherein the plurality of stems and the endcap are each sized to prevent clipping of light beams that propagate along each of the optical fibers and diffract through the plurality of stems and the endcap.

5. The multi-fiber endcap array of claim 1, wherein the endcap is formed of monolithic glass.

6. The multi-fiber endcap array of claim 5, wherein the stems are formed from the same monolithic glass as the endcap and there is no discontinuity between each of the plurality of stems and the endcap.

7. An apparatus comprising:
    a plurality of multi-fiber endcap arrays, wherein each of the plurality of multi-fiber endcap arrays comprises:
        an endcap comprising a stem surface and an exit surface, wherein the exit surface opposes the stem surface;
        a plurality of stems extending from the stem surface of the endcap; and
        a plurality of optical fibers, wherein each of the plurality of optical fibers is optically coupled and mechanically coupled to a corresponding stem of the plurality of stems; and
    a base underlying the plurality of multi-fiber endcap arrays;
    wherein the plurality of multi-fiber endcap arrays are adhered together.

8. The apparatus of claim 7, wherein narrow surfaces of the plurality of multi-fiber endcap arrays are adhered together to form an extended one-dimensional multi-fiber endcap array.

9. The apparatus of claim 7, wherein wide surfaces of the plurality of multi-fiber endcap arrays are adhered together to form a two-dimensional multi-fiber endcap array.

10. The apparatus of claim 7, wherein narrow surfaces and wide surfaces of the plurality of multi-fiber endcap arrays are adhered together to form a two-dimensional multi-fiber endcap array.

11. A method comprising:
    forming a plurality of stems that are rigidly attached to a monolithic glass block;
    slicing the monolithic glass block to form a plurality of stemmed endcaps; and
    fusing a plurality of optical fibers to a set of stems on a given endcap of the plurality of stemmed endcaps,
    wherein each stem in the set of stems is coupled to a corresponding optical fiber of the plurality of optical fibers at a given surface and the given surface of each stem in the set of stems has an area greater than an area of a cross section of the corresponding optical fiber and each of the given endcap and the set of stems are sized to avoid clipping of light beams that propagate through each of the plurality of optical fibers and diffract through the set of stems and the given endcap.

12. The method of claim 11, wherein the forming comprises machining the monolithic glass block in a subtractive manufacturing process to form the stems.

13. The method of claim 12, wherein there is no interface between the plurality of stems and the monolithic glass block.

14. The method of claim 11, wherein the forming comprises attaching the plurality of stems to the monolithic glass block.

15. The method of claim 11, wherein fusing comprises heating a given stem and an end of a given optical fiber to fuse a cross section of the given optical fiber to the given surface of the given stem.

16. The method of claim 15, wherein the given stem is sufficiently long to reduce heat conduction into the endcap during the heating.

17. The method of claim 11, wherein the monolithic glass block is fused silica.

18. The method of claim 11, further comprising applying an antireflection coating on an exit face of the monolithic glass block.

* * * * *